Patented Dec. 31, 1929

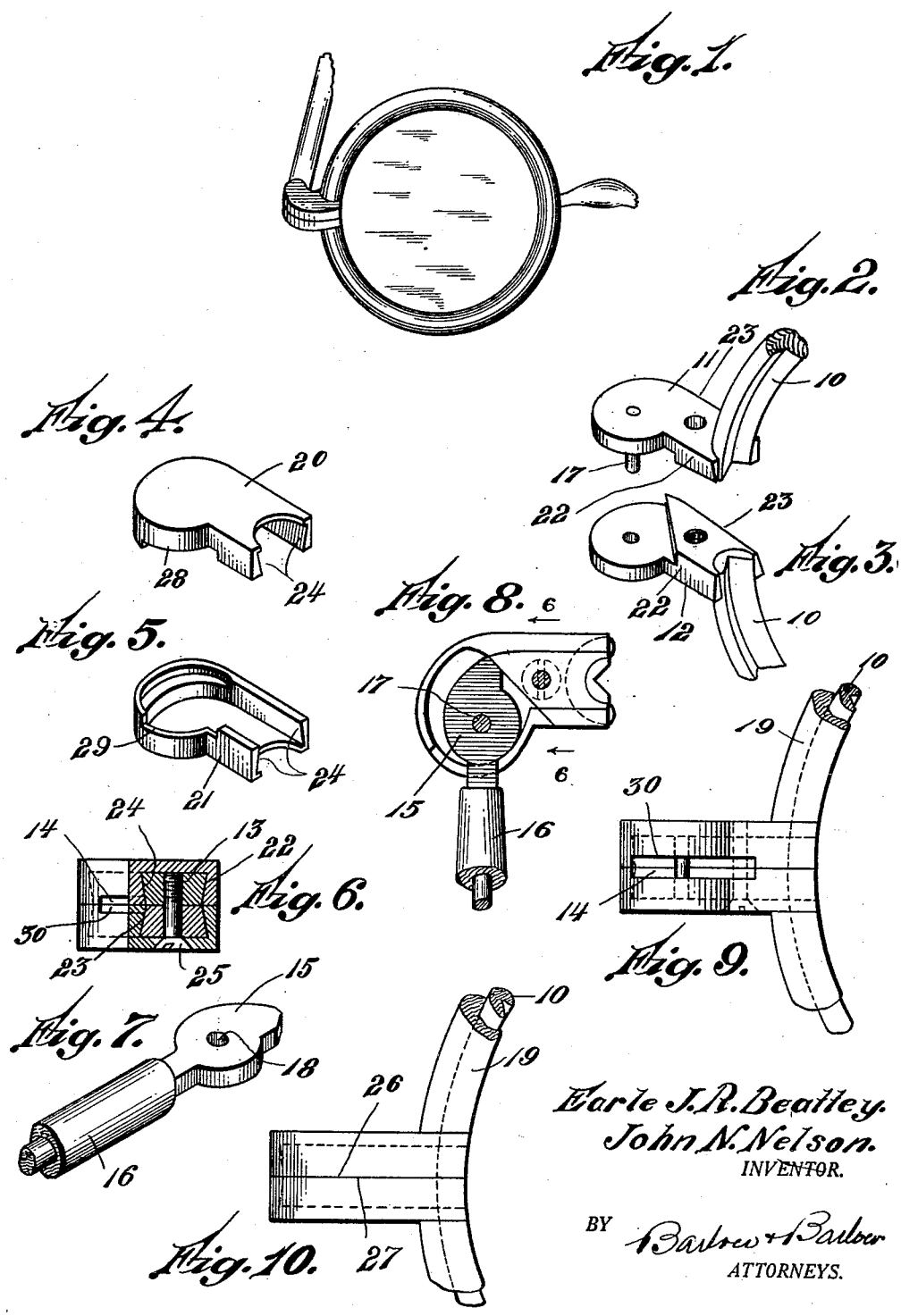

1,741,807

UNITED STATES PATENT OFFICE

EARLE J. R. BEATTEY, OF EDGEWOOD, AND JOHN N. NELSON, OF CRANSTON, RHODE ISLAND, ASSIGNORS TO UNIVERSAL OPTICAL CORPORATION, OF PROVIDENCE, RHODE ISLAND, A CORPORATION OF RHODE ISLAND

OPHTHALMIC MOUNTING

Application filed March 20, 1928. Serial No. 263,022.

This invention relates to an improved ophthalmic mounting and more particularly to the provision of a non-metallic covering for the metallic end-piece of the eye wire; and the object of this invention is to provide in such a mounting a non-metallic covering for the metallic end-piece of the eye wire.

A further object of this invention is the provision of a metallic eye wire with a non-metallic end-piece slotted to receive the joint end of the temple and to provide a non-metallic covering for the end-piece having edge walls arranged to cover the front portion of the joint slot to give the appearance of an unslotted end-piece as viewed from the front of the mounting.

A further object of the invention is to so shape the side walls of the end-piece parts that the non-metallic covering members will snap on to these end-piece parts and so be held in position thereon without other fastenings, if desired.

With these and other objects in view, the invention consists of certain novel features of construction, as will be more fully described, and particularly pointed out in the appended claims.

In the accompanying drawings:

Figure 1 is a perspective view from the front showing one of the eye wires of a pair of spectacles and showing the non-metallic covering as incasing the end-piece of the eye wire closing the front portion of the slot thereof.

Figures 2 and 3 are separate parts of the end-piece of the eye wire.

Figures 4 and 5 are separate parts of the non-metallic casings or coverings for the separate members of the eye wire end-piece.

Figure 6 is a section on line 6—6 of Figure 8, showing the beveled edge walls of the opposite end-piece parts and the non-metallic casing or covering as snapped into position over these beveled walls to dovetail the two together.

Figure 7 is a perspective view showing the end portion of the temple joint.

Figure 8 is a top view of the end-piece with one of the halves removed showing the temple joint as pivoted in the ear piece.

Figure 9 is a rear view of the temple joint with the non-metallic casing or covering applied thereto.

Figure 10 is an enlarged front view of the temple joint showing the casing as covering the joint slot in the end piece.

It is found in the practical construction and operation of ophthalmic mountings of this character where the eye wire is formed of metal and is split radially to be separated for the reception of the lens, and where the opposite ends of this eye wire have two co-operating portions of a metal end piece, that it is of advantage to cover the exposed metal surfaces of the end-piece for several reasons; first, to prevent the metal from becoming corroded under action of the acids of the skin of the wearer; second, to be able to close the front portion of the joint slot of the end-piece; and third, to render the appearance of the spectacle more uniform by covering the metallic end-piece thereof, particularly where the eye wire is provided with a non-metallic rim; and the following is a detailed description of the present embodiment of our invention and showing one arrangement of casing or covering for the end-pieces of the mounting by which these advantageous results may be accomplished:—

With reference to the drawings, 10 designates the metallic eye wire, to the opposite ends of which are connected the parts 11 and 12 of the end-piece member, which parts are designed to be secured together by means of a threaded binding screw 13, and this end-piece is slotted at its extremity as at 14, to receive the joint portion 15 of the temple 16. A pivot pin is herein shown in the end-piece as positioned to extend through the eye 18 of the temple to hinge the same to the end piece. In some instances, particularly where the eye wire is covered with a non-metallic rim 19, it is found of advantage to also cover this end-piece with a non-metallic casing or covering which when the end-piece is formed in halves as herein illustrated, the casing or covering may also be formed in halves 20 and 21, respectively.

In order to secure these casings or coverings to their respective end-piece portions, I preferably bevel the side edges 22 and 23, of these end-piece portions, and I also bevel or incline the inner surface 24 of the side walls of the casings so that they will snap over these beveled edges of the end-piece and thus be secured thereon without the necessity of employing cement or other fastening, but in some cases the head 25 of the binding screw 13 may serve to assist in binding one of the coverings or casings, if desired.

These non-metallic casing members are formed to fit snugly about the end-piece members and the edges 28 and 29 on the rear edge are notched to form a slot 30 through which the temple joint 15 extends and the edges 26 and 27 at the front of these casing members are preferably arranged to abut one against the other and so close this joint slot 14, as best illustrated in Figures 1 and 10, while in the seat.

By this improved construction, it will be seen that where the metal eye wire is covered with a non-metallic rim and the end-piece parts are covered with non-metallic casing or covering members these metallic parts of the spectacle are entirely protected against corrosion from the acids of the skin; also the spectacle thus formed presents a uniform appearance as none of the metal is exposed.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. A spectacle frame having an eye wire with a metallic end-piece formed in two parts secured together, each part having a beveled edge inwardly inclined towards the other, and a non-metallic covering for each of said parts, each having resilient side walls arranged to snap over the beveled edges of the end-piece to lock the two together.

2. A spectacle frame having an eye wire with a metallic end-piece formed in two parts secured together, each part having a beveled edge inwardly inclined towards the other, and a non-metallic covering for each of said parts, each having resilient side walls with an inclined inner face to snap over the beveled edges of the end-piece to lock the two together.

In testimony whereof we affix our signatures.

EARLE J. R. BEATTEY.
JOHN N. NELSON.